US012121856B2

(12) United States Patent
Li et al.

(10) Patent No.: US 12,121,856 B2
(45) Date of Patent: Oct. 22, 2024

(54) SOLID MATERIAL FOR PURIFYING AIR AND PREPARATION METHOD AND USE THEREOF

(71) Applicants: MYAIRSHIELD, LIMITED, Hong Kong (CN); HEBEI LICHE ZHUOGE NEW MATERIALS CO., LTD, Hebei (CN)

(72) Inventors: Yingjiu Li, Hebei (CN); Jiagang Li, Hebei (CN); Jiawang Li, Hebei (CN); Zhao Li, Hebei (CN)

(73) Assignees: MYAIRSHIELD, LIMITED, Hong Kong (CN); HEBEI LICHE ZHUOGE NEW MATERIALS CO., LTD., Hebei (CN)

( * ) Notice: Subject to any disclaimer, the term of this patent is extended or adjusted under 35 U.S.C. 154(b) by 423 days.

(21) Appl. No.: 17/753,288

(22) PCT Filed: Aug. 25, 2020

(86) PCT No.: PCT/CN2020/111080
§ 371 (c)(1),
(2) Date: Feb. 25, 2022

(87) PCT Pub. No.: WO2021/037023
PCT Pub. Date: Mar. 4, 2021

(65) Prior Publication Data
US 2022/0297060 A1  Sep. 22, 2022

(30) Foreign Application Priority Data
Aug. 26, 2019  (CN) .......................... 201910790228.8

(51) Int. Cl.
*B01D 53/02*  (2006.01)
*B01D 53/22*  (2006.01)
*B01D 53/85*  (2006.01)

(52) U.S. Cl.
CPC .......... *B01D 53/85* (2013.01); *B01D 53/228* (2013.01); *B01D 2257/91* (2013.01); *B01D 2257/93* (2013.01); *B01D 2258/06* (2013.01)

(58) Field of Classification Search
CPC ........ A01N 25/08; A01N 25/34; A01N 59/00; A01N 59/16; A01P 1/00; B01D 2251/108; B01D 2255/2027; B01D 2255/20707; B01D 2255/50; B01D 2255/9202; B01D 2255/9205; B01D 2255/9207; B01D 2257/708; B01D 2257/91; B01D 2257/93; B01D 2258/06; B01D 2259/4508; B01D 2259/802; B01D 2259/804; B01D 53/228; B01D 53/72; B01D 53/85; B01D 53/885; B01D 53/8668; B01J 20/046; B01J 20/06; B01J 20/08; B01J 20/183; B01J 20/223; B01J 20/28057; B01J 20/28069; B01J 20/28078; B01J 20/3028; B01J 20/3204; B01J 20/3236; B01J 20/3238; B01J 20/3291; B01J 2220/49; Y02A 50/20

See application file for complete search history.

(56) References Cited

U.S. PATENT DOCUMENTS

2018/0235246 A1\* 8/2018 Abbott ................... B01J 19/123
2023/0201789 A1\* 6/2023 Abbott ................... B32B 15/08
  204/157.48

FOREIGN PATENT DOCUMENTS

| CN | 101810874 A | 8/2010 |
|---|---|---|
| CN | 102381722 A | 3/2012 |
| CN | 103263889 A | 8/2013 |
| CN | 104174269 A | 12/2014 |
| CN | 105849035 A | 8/2016 |
| CN | 107252699 A | 10/2017 |
| CN | 108295833 A | 7/2018 |
| CN | 108349202 A | 7/2018 |
| CN | 108651453 A | 10/2018 |
| CN | 109173660 A | 1/2019 |
| CN | 109362779 A | 2/2019 |
| CN | 109529954 A | 3/2019 |

(Continued)

OTHER PUBLICATIONS

Translation of CN109362779; Tangshan Zuolun Environmental Protection Tech Co (Year: 2019).\*
Translation of CN109529954; Sozhou Sunlights Tech Co LTD (Year: 2019).\*
Chinese Office Action mailed Sep. 25, 2023 in Chinese Application No. 202080060348.3, a foreign corresponding application of U.S. Appl. No. 17/753,288, 24 pages.
European Search Report mailed Sep. 7, 2023 in European Application No. 20856927.7, a foreign corresponding application of U.S. Appl. No. 17/753,288, 9 pages.

(Continued)

*Primary Examiner* — Christopher P Jones
(74) *Attorney, Agent, or Firm* — Lee & Hayes, P.C.

(57) ABSTRACT

The invention provides a solid material for air purification and disinfection and a preparation method and application thereof. The solid material includes: 50-60 wt. % of inorganic porous materials, 10-20 wt. % of nano titanium dioxide, 3-5 wt. % of fluorescent materials, 20-30 wt. % of sodium chlorite, 3-5 wt. % of sodium lignosulfonate, 1-10 wt. % of polyethylene glycol, and 1-10 wt. % of polyvinyl alcohol. The method for preparing the solid material includes: formulating the fluorescent material into a slurry by using a polyethylene glycol aqueous solution; uniformly mixing the nano titanium dioxide, the sodium lignosulfonate, and the fluorescent material formulated into the slurry, and then spraying the mixture on an inorganic porous material carrier to be uniformly adsorbed; and mixing the sodium chlorite with the above mixture for granulation to obtain the product. The solid material for air purification of the invention can be stored stably for a long time, and chlorine dioxide gas slowly released can degrade harmful substances in the air such as formaldehyde and kill bacteria in the air.

16 Claims, No Drawings

(56) References Cited

FOREIGN PATENT DOCUMENTS

| | | |
|---|---|---|
| CN | 110508128 A | 11/2019 |
| JP | 2002346394 A | 12/2002 |
| JP | 2011-93737 A | 5/2011 |
| WO | WO2017031349 A1 | 2/2017 |

OTHER PUBLICATIONS

Fu et al., "Adsorption of heavy metal sewage on nano-materials such as titanate/TiO2 added lignin," Results in Physics, 2019, 12:405-411.
International Search Report and Written Opinion dated Nov. 18, 2020 in PCT Application No. PCT/CN2020/111080, 13 pages.

* cited by examiner

SOLID MATERIAL FOR PURIFYING AIR AND PREPARATION METHOD AND USE THEREOF

CROSS-REFERENCE TO RELATED APPLICATION

This application is a U.S. National Phase Application of International Application No. PCT/CN2020/111080, filed Aug. 25, 2020, which claims priority to Chinese patent application no. 201910790228.8, filed on Aug. 26, 2019, the contents of both of which are incorporated in their entirety by reference herein.

BACKGROUND

Technical Field

The invention relates to the technical field of air purification, and in particular, to a solid material for air purification and a preparation method thereof, and application of the solid material.

Related Art

Chlorine dioxide is a non-toxic, harmless, highly effective, and highly oxidizing disinfectant, and has functions such as anticorrosion, deodorization, and freshness preservation, etc. In addition, chlorine dioxide has advantages of being non-pathogenic, non-teratogenic, and non-carcinogenic. Chlorine dioxide has been approved by the U.S. Food and Drug Administration (FDA), U.S. Environmental Protection Agency (EPA), and U.S. Department of Agriculture (USDA) in the 1980s, and is the top A1 disinfectant in safe disinfection methods. Under the same conditions, disinfection performance of chlorine dioxide is 2.63 times that of chlorine, and has characteristics such as a wide disinfection range, a good effect, a short action time, and a low dosage, etc.

Due to physical characteristics of chlorine dioxide, an aqueous solution of chlorine dioxide is used for disinfection in most cases. However, as a result of disadvantages such as high concentration, a short release period, inconvenient transportation and storage of the chlorine dioxide solution and a need to configure an aqueous solution of chlorine dioxide at a use site, advantages such as a wide diffusion range and strong effectiveness of gaseous chlorine dioxide cannot be fully exerted. Therefore, people often use solid-loaded chlorine dioxide products to resolve the above technical problems. Common solid carriers include silica gel, calcium silicate, diatomaceous earth, talc, molecular sieve, active carbon, super absorbent polyacrylic resin, agar, super absorbent resin, and carboxymethyl cellulose, etc. However, the solid carriers have disadvantages such as a low adsorption capacity, a short service period after loading of chlorine dioxide, storage difficulty and/or a poor effect, etc.

SUMMARY

The invention provides a solid material for air purification and a preparation method thereof. The solid material can resolve one or more of the above technical problems.

In one aspect, an implementation of the invention provides a solid material, including: 50-60 wt. % of inorganic porous materials, 10-20 wt. % of nano titanium dioxide, 3-5 wt. % of fluorescent materials, 20-30 wt. % of sodium chlorite, 3-5 wt. % of sodium lignosulfonate, 1-10 wt. % of polyethylene glycol, and 1-10 wt. % of polyvinyl alcohol, where the above weight percentage is a proportion of a weight of each component to a total weight of the solid material.

Optionally, the inorganic porous material is active alumina or activated zeolite.

Optionally, the active alumina has a specific surface area of 200-350 $m^2/g$ measured according to a BET test method, a pore volume of 0.3-0.45 ml/g, and an average pore size of 2-50 nm.

Optionally, the activated zeolite has a specific surface area of 500-800 $m^2/g$ measured according to a BET test method, a pore volume of 0.3-0.85 ml/g, and an average pore size of 2-60 nm.

Optionally, the fluorescent material is an alkaline earth aluminate fluorescent material emitting fluorescence with a wavelength of 400-580 nm.

Optionally, the polyethylene glycol has a weight average molecular weight less than 2000.

Optionally, the nano titanium dioxide is titanium dioxide with an average particle diameter of 1-150 nm.

Optionally, the sodium lignosulfonate has a molecular weight of 400-700.

In another aspect, the invention provides a method for preparing any of the above solid materials, including:

weighing an inorganic porous material, nano titanium dioxide, a fluorescent material, sodium chlorite, sodium lignosulfonate, polyethylene glycol, and polyvinyl alcohol;

formulating the fluorescent material and a polyethylene glycol aqueous solution into a uniformly dispersed paste to prepare a first slurry;

uniformly mixing the nano titanium dioxide, the sodium lignosulfonate, and the first slurry to prepare a second slurry;

spraying the second slurry onto the inorganic porous material, and stirring the inorganic porous material while spraying, to form a pre-product in which the second slurry is uniformly adsorbed on the inorganic porous material; and mixing the sodium chlorite and the pre-product, putting the mixture into a granulator and spraying a polyvinyl alcohol aqueous solution into the granulator for granulation, and then performing drying to prepare the solid material.

Optionally, the polyethylene glycol is polyethylene glycol 1200, and concentration of the polyethylene glycol aqueous solution is 0.05-0.1 wt. %.

Optionally, concentration of the polyvinyl alcohol aqueous solution is 1-8 wt. %.

Optionally, the drying step comprises heating granulated particles to 500-600° C. at a rate of 1-3° C./min, and then keeping the temperature for 1.5-5 hours.

Optionally, the fluorescent material is formulated into a slurry by using the polyethylene glycol aqueous solution, and is dispersed uniformly by using ultrasonic waves.

Optionally, the inorganic porous material is active alumina, and the active alumina is prepared by using the following method:

adding quick dehydration powder (ρ-alumina powder) to hydrated aluminum hydroxide and performing quick dehydration to prepare a first alumina material;

adding macroporous pseudo-boehmite to the first alumina material and uniformly mixing the mixture to prepare a second alumina material;

maturing the second alumina material by using microwaves; and performing calcination at a temperature of 450-800° C. to prepare the active alumina material.

In still another aspect, the invention provides application of any of the above solid materials in air purification.

Optionally, the solid material is used in a fresh air system or an air purifier.

In yet another aspect, the invention provides application of any of the above solid materials in disinfection.

The technical solutions according to the implementations of the invention can achieve the following beneficial technical effects.

The solid material for air purification or air disinfection of the invention can excite light with a specific wavelength of 400-580 nm through the fluorescent material under irradiation of visible light. The light of the specific wavelength can excite photocatalytic activity of the nano titanium dioxide, helping the sodium chlorite wrapped in the solid material slowly release a proper amount of chlorine dioxide gas. Moreover, the sodium chlorite is wrapped in pores or on the surface of the solid material by using suitable wrapping materials and stabilizers so that the sodium chlorite exists stably for a long time.

In addition, a process for preparing the solid material for air purification of the invention is simple and raw materials are easily available, avoiding loss or decomposition of the sodium chlorite during the preparation, and overcoming disadvantages such as a short service period and storage difficulty and/or a poor effect, etc. of a material loaded with the chlorine dioxide.

In addition, chlorine dioxide gas slowly released by the solid material for air purification of the invention can degrade harmful substances in the air such as formaldehyde and disinfect the air. For example, the solid material may be used in a ventilation system or a fresh air system and an air purifier to purify the air.

DETAILED DESCRIPTION

The following clearly and completely describes the technical solutions of the invention with reference to implementations and specific embodiments of the invention. Apparently, the described implementations or embodiments are merely a part rather than all of the implementations or embodiments of the invention. All other implementations obtained by a person of ordinary skill in the art based on the implementations of the invention without creative efforts shall fall within the protection scope of the invention.

According to an implementation of the invention, a solid material for air purification and air disinfection is provided, including: 50-60 wt. % of inorganic porous materials, 10-20 wt. % of nano titanium dioxide, 3-5 wt. % of fluorescent materials, 20-30 wt. % of sodium chlorite, 3-5 wt. % of sodium lignosulfonate, 1-10 wt. % of polyethylene glycol, and 1-10 wt. % of polyvinyl alcohol, where the above weight percentage is a proportion of a weight of each component to a total weight of the solid material.

In an optional implementation of the invention, the inorganic porous material is active alumina. Optionally, the active alumina has a specific surface area of 200-350 $m^2/g$ measured according to a BET test method, a pore volume of 0.3-0.45 ml/g, an ignition loss less than or equal to 7 wt. %, and $Na_2O$ less than or equal to 0.45 wt. %. The ignition loss herein is a proportion of a weight reduced after the porous alumina material is heated to 500-600° C. and the temperature is maintained for 2 hours. A weight proportion of sodium oxide is less than 0.45 wt. %. Exemplarily, the weight proportion of the sodium oxide is 0.001 wt. %.

Optionally, the alumina has an average particle size of 0.1-10 mm, exemplarily, an average particle size of 0.5-8 mm, more exemplarily, an average particle size of 0.8-6 mm, or even more exemplarily, an average particle size of 1.5-5 mm.

In an optional implementation of the invention, the inorganic porous material is activated zeolite. Optionally, the activated zeolite has a specific surface area of 500-800 $m^2/g$ measured according to a BET test method, a pore volume of 0.3-0.85 ml/g, and an average pore size of 2-60 nm. Optionally, the activated zeolite has a density of 1.8-2.2 $g/cm^3$ and a porosity greater than or equal to 50%. Optionally, the activated zeolite has an average particle size of 0.1-10 mm, exemplarily, an average particle size of 0.5-8 mm, more exemplarily, an average particle size of 0.8-6 mm, or even more exemplarily, an average particle size of 1.5-5 mm.

In an optional implementation of the invention, the nano titanium dioxide is titanium dioxide with an average particle diameter of 1-100 nm, more exemplarily, 5-60 nm, or even more exemplarily 5-30 nm.

In an optional implementation of the invention, the fluorescent material may be an alkaline earth aluminate fluorescent material emitting fluorescence with a wavelength of 400-580 nm. Optionally, the alkaline earth aluminate fluorescent material is doped with at least one rare earth ion such as lanthanum, cerium, praseodymium, neodymium, samarium, gadolinium, terbium, dysprosium, europium, holmium, erbium, thulium, ytterbium, or lutetium, etc., especially, doped with boron in an alkaline earth aluminate matrix. The alkaline earth aluminate luminescent material may be irradiated by natural visible light or a daylight lamp to effectively convert absorbed light energy into fluorescence with a wavelength of 400-580 nm for emitting. The emitted fluorescence lasts for 8-10 hours, a brightness of the emitted fluorescence is greater than 10 $mcd/m^2$, and duration when the luminance brightness decreases to 0.32 $mcd/m^2$ can be more than 70 hours. Moreover, the alkaline earth aluminate fluorescent material is non-toxic and non-radioactive, and produces no harmful substances during production. For example, the alkaline earth aluminate fluorescent material may be a fluorescent material disclosed in patent CN1053789A1. Optionally, an average particle size of the fluorescent material is 1-50 nm, or more exemplarily, 1-20 nm, so that the fluorescent material can be uniformly distributed on the inorganic material.

Optionally, a weight average molecular weight of the polyethylene glycol is less than 2000. The weight average molecular weight of the polyethylene glycol is exemplarily less 1500, more exemplarily, less than 1000, or even more exemplarily, less than 700.

According to another implementation of the invention, a method for preparing any of the above solid materials is provided, including:
  weighing an inorganic porous material, nano titanium dioxide, a fluorescent material, sodium chlorite, sodium lignosulfonate, polyethylene glycol, and polyvinyl alcohol;
  formulating the fluorescent material and a polyethylene glycol aqueous solution into a uniformly dispersed paste to prepare a first slurry;
  uniformly mixing the nano titanium dioxide, the sodium lignosulfonate, and the first slurry to prepare a second slurry;
  spraying the second slurry onto the inorganic porous material, and stirring the inorganic porous material while spraying, to form a pre-product in which the second slurry is uniformly adsorbed on the inorganic porous material; and mixing the sodium chlorite and the pre-product, putting the mixture into a granulator and spraying a polyvinyl alcohol aqueous solution into the granulator for granulation, and then performing drying to prepare the solid material.

According to the preparation method of the invention, various solid particle materials are uniformly mixed through the first step, then the sodium chlorite is mixed with the second slurry and saturated and adsorbed by an active inorganic porous material, and then an organic layer such as a polyvinyl alcohol layer is wrapped on surfaces of the particles, so that the solid material of the invention is easily stored stably for a long time. In addition, the fluorescence emitted by the fluorescent material can act on the nano titanium dioxide and/or the sodium chlorite so that the solid material slowly releases chlorine dioxide gas.

Optionally, concentration of the polyethylene glycol aqueous solution is 0.05-0.1 wt. %, or exemplarily, 0.08-0.1 wt. %.

Optionally, concentration of the polyvinyl alcohol aqueous solution is 1-8 wt. %, more exemplarily, 3-5 wt. %, or even more exemplarily, 5 wt. %.

Optionally, the drying step includes heating granulated particles to 500-600° C. at a rate of 1-3° C./min, and then keeping the temperature for 1.5-5 hours, exemplarily, 1.5-2.5 hours, or more exemplarily, 2 hours.

Optionally, the fluorescent material is formulated into a slurry by using the polyethylene glycol aqueous solution, and is dispersed uniformly by using ultrasonic waves. Optionally, the ultrasonic dispersion lasts for 0.1-1.0 hours, or more exemplarily, 0.2-0.5 hours.

Optionally, the inorganic porous material is active alumina, and the active alumina is prepared by using the following method: adding quick dehydration powder (ρ-alumina powder) to hydrated aluminum hydroxide and performing quick dehydration to prepare a first alumina material; adding macroporous pseudo-boehmite to the first alumina material and uniformly mixing the mixture to prepare a second alumina material; maturing the second alumina material by using microwaves; and performing calcination at a temperature of 450-800° C. to prepare the active alumina material. The hydrated aluminum hydroxide herein may be a common hydrated aluminum hydroxide material. The quick dehydration powder (whose main component is ρ-alumina powder) may be a common commercially available alumina particle material. The macroporous pseudo-boehmite may also be a commercially available pseudo-boehmite, especially a macroporous pseudo-boehmite material with a large pore volume and a high specific surface area.

The active alumina porous material prepared by using the above method has a specific surface area of 200-350 $m^2/g$ and a pore volume of 0.3-0.45 ml/g. Optionally, the active alumina porous material prepared by using the above method has an ignition loss less than or equal to 7% and a sodium oxide content less than or equal to 0.45%.

Optionally, the inorganic porous material of the invention adopts porous alumina prepared by using the above method or a porous alumina material having equivalent physical and chemical properties. The active porous alumina material generally has better strength than other inorganic materials, and also has better alumina activity than other inorganic materials, and a porosity and a specific surface structure thereof are more suitable for adsorbing sodium chlorite. In addition, the active alumina is an amphoteric substance, which can automatically adjust acid-base balance, so that an amount of chlorine dioxide released can be more easily controlled.

According to still another implementation of the invention, application of the above solid material in air purification is provided.

According to yet another implementation of the invention, application of the above solid material in disinfection is provided.

Optionally, the solid material is used in a fresh air system or an air purifier.

The technical solutions according to the implementations of the invention can achieve the following beneficial technical effects.

The solid material of the invention can excite light with a specific wavelength of 400-580 nm through the fluorescent material under irradiation of visible light. The light of the specific wavelength can excite photocatalytic activity of the nano titanium dioxide, helping the sodium chlorite wrapped in the solid material slowly release a proper amount of chlorine dioxide gas. Moreover, the sodium chlorite is wrapped in pores or on the surface of the solid material by using suitable wrapping materials and stabilizers so that the sodium chlorite exists stably for a long time. In addition, a process for preparing the solid material of the invention is simple and raw materials are easily available, avoiding loss or decomposition of the sodium chlorite during the preparation, and overcoming disadvantages such as a short service period and storage difficulty and/or a poor effect, etc. of a material loaded with the chlorine dioxide. In addition, chlorine dioxide gas slowly released by the solid material of the invention can degrade VOC gases in the air such as formaldehyde and disinfect the air.

EMBODIMENTS

The following clearly and completely describes the technical solutions of the invention with reference to specific embodiments. Apparently, the described implementations or embodiments are merely a part rather than all of the implementations or embodiments of the invention.

Embodiment 1

52 g of inorganic porous active alumina materials (having a specific surface area of 287 $m^2/g$ and a pore volume of 0.41 ml/g), 18 g of nano titanium dioxide, 4 g of fluorescent materials (purchased from Wuqiang Liche Luminous Material Co., Ltd. and having an average particle size of 18 nm), 24 g of sodium chlorite (purchased from Shandong Vosges Group Co., Ltd.), 2 g of sodium lignosulfonate (purchased from Hebei Liche Photoelectric Material Co., Ltd.), 2 g of polyethylene glycol 1200 (purchased from Hengshui Donghai Chemical Equipment Co., Ltd.), and 6 g of polyvinyl alcohol (purchased from Hengshui Donghai Chemical Equipment Co., Ltd.) are weighed. Phosphor is formulated into a paste by using 500 ml of polyethylene glycol 1200 aqueous solution (concentration of polyethylene glycol 1200 is 0.1 wt. %), and the mixture is uniformly dispersed after stirring. The nano titanium dioxide (having an average particle size of 21 nm) and the sodium lignosulfonate (having a molecular weight of 634.5) are mixed with the pasty phosphor. Then the mixture is sprayed onto an inorganic porous material carrier, and the inorganic material is stirred while spraying for uniform adsorption and mixing, so as to form a pre-product.

The sodium chlorite and the above pre-product are mixed and put into a granulator, and 500 ml of binder is sprayed into the granulator, which is a polyvinyl alcohol aqueous solution (concentration of the polyvinyl alcohol is 5 wt. %), and coating and granulation are performed. Then a temperature is increased to 600° C. at a rate of 1° C./min, and then the temperature of 600° C. is maintained for 2 hours to obtain the solid particle product.

The solid particle product in this embodiment may be activated to release chlorine dioxide gas. Detection is performed by using the following method: the product in this embodiment is placed under a 365 nm ultraviolet lamp (10-15 cm away from the ultraviolet lamp) in a dark room and is irradiated for 5 minutes or is irradiated by natural light, and the product in this embodiment emits light. After the light source is turned off, the product in this embodiment continues to emit light for more than 30 minutes in the dark, indicating that the product in this embodiment is activated. Moreover, slowly released chlorine dioxide gas is continuously detected around the solid particle product of the invention. Time and concentration changes of the slowly released chlorine dioxide gas are tested below.

Embodiments 2-6

The solid material for air purification described in embodiments 2-5 is prepared according to the above preparation method in embodiment 1, except for different ingredients and compositions. Specific composition proportions are shown in the following Table 1.

Comparative Example 1

The current solid particle material including chlorine dioxide and porous alumina and prepared by using an impregnation method in the prior art is adopted. 52 g of inorganic porous active alumina materials (having a specific surface area of 287 $m^2/g$ and a pore volume of 0.41 ml/g) and 24 g of sodium chlorite (purchased from Shandong Vosges Group Co., Ltd.) are weighed. 24 g of sodium chlorite is dissolved in 500 ml of water to form a sodium chlorite aqueous solution, and the inorganic porous active alumina material is immersed in the sodium chlorite aqueous solution to form a solid material adsorbing the sodium chlorite. The solid material is the solid material prepared in comparative example 1.

TABLE 1

Formulation and composition in embodiments 1-5 and comparative example 1

| | Embodiment 1 | Embodiment 2 | Embodiment 3 | Embodiment 4 | Embodiment 5 | Embodiment 6 | Comparative example 1 |
|---|---|---|---|---|---|---|---|
| Active alumina (g) | 52 | 58 | 48 | 45 | 62 | 52 | 52 |
| Nano titanium dioxide (g) | 18 | 10 | 22 | 22 | 15 | 15 | — |
| Fluorescent material (g) | 4 | 3 | 5 | 4 | 4 | 4 | — |
| Sodium chlorite (g) | 24 | 25 | 22 | 24 | 35 | 38 | 24 |
| Sodium lignosulphonate (g) | 2 g | 1.7 | 2.5 | 2.1 | 1.5 | 1.5 | — |
| polyethylene glycol (g) | 2 | 2 | 2 | 2 | 2 | 2 | — |
| polyvinyl alcohol (g) | 6 | 6 | 5 | 6 | 7 | 6 | — |

Air purification and disinfection effects of the solid materials prepared in embodiments 1-6 and comparative example 1 are respectively tested by using the following test methods. Contents of chlorine dioxide gas slowly released around the solid material at different time points are tested by using ultraviolet-visible spectrophotometry. Antibacterial, disinfection, and air purification effects of household and similar electrical appliances are tested by using the national standard GB21551.3-2010. Formaldehyde degradation performance at different time points is tested by using a national standard GB/T18801 air purifier. In addition, the test operation is performed in accordance with the "Technical standard for disinfection" (2008).

TABLE 2

Detection results of concentration of chlorine dioxide released by solid materials in embodiments 1-6 and comparative example 1

| Time | Embodiment 1 | Embodiment 2 | Embodiment 3 | Embodiment 4 | Embodiment 5 | Embodiment 6 | Comparative example 1 |
|---|---|---|---|---|---|---|---|
| 1 hour | 0.098 | 0.098 | 0.096 | 0.098 | 0.098 | 0.098 | 0.132 |
| 3 hours | 0.098 | 0.098 | 0.096 | 0.098 | 0.098 | 0.098 | 0.045 |
| 6 hours | 0.098 | 0.098 | 0.096 | 0.098 | 0.098 | 0.098 | 0.015 |
| 10 hours | 0.098 | 0.098 | 0.096 | 0.097 | 0.098 | 0.098 | 0.005 |

TABLE 2-continued

Detection results of concentration of chlorine dioxide released by solid materials in embodiments 1-6 and comparative example 1

| Time | Embodiment 1 | Embodiment 2 | Embodiment 3 | Embodiment 4 | Embodiment 5 | Embodiment 6 | Comparative example 1 |
|---|---|---|---|---|---|---|---|
| 24 hours | 0.098 | 0.098 | 0.096 | 0.097 | 0.098 | 0.098 | 0.0015 |
| 7 days | 0.097 | 0.097 | 0.094 | 0.097 | 0.098 | 0.098 | Not detected* |

*Note:
Released chlorine dioxide gas is not detected as a result of exceeding aminimum detection limit of a detection instrument Concentration of chlorine dioxide gas ($mg/m^3$) is tested at a distance of 5 cm from an air outlet. Specifically, contents of chlorine dioxide gas slowly released around the solid material in 1, 3, 6, 10, and 24 hours and 7 days are tested by using ultraviolet-visible spectrophotometry. The detection results of the concentration of the chlorine dioxide released by the solid materials in embodiments 1-6 and comparative example 1 are shown in Table 2. All units in Table 2 are milligrams of chlorine dioxide gas per cubic meter of air ($mg/m^3$). It may be learned from Table 2 that over time (from 1 hour to 24 hours, or even 7 days), the solid materials prepared in embodiments 1-6 can slowly and stably release chlorine dioxide gas. Even after a long period of 7 days, the solid materials in embodiments 1-6 of the invention can still release chlorine dioxide gas of at least 0.094 $mg/m^3$. The solid material prepared in comparative example 1 releases a large amount of chlorine dioxide gas from the first hour, but after 10 hours, releases much less chlorine dioxide gas, and after 7 days, releases an amount of chlorine dioxide gas that almost cannot be detected. Therefore, compared with the existing materials (comparative example 1), the solid materials in embodiments 1-6 of the invention can slowly and steadily release chlorine dioxide gas, and even after 7 days of use, releases a relatively high content of chlorine dioxide gas that can still be detected.

TABLE 3

Test results of formaldehyde degradation performance of solid materials in embodiment 1 and comparative example 1

| | Time | Residual formaldehyde concentration ($mg/m^3$) | Formaldehyde removal rate (%) |
|---|---|---|---|
| Embodiment 1 | 1 hour | 0.003 | 99.7% |
| | 10 hours | 0.003 | 99.7% |
| | 24 hours | 0.004 | 99.6% |
| | 7 days | 0.006 | 99.4% |
| Comparative example 1 | 1 hour | 0.002 | 99.8% |
| | 10 hours | 0.119 | 88.1% |
| | 24 hours | 0.197 | 80.3% |
| | 7 days | 0.924 | 7.6% |

Taking the solid material prepared in embodiment 1 as a representative, formaldehyde degradation performance of the solid material prepared in the invention and the solid material prepared in comparative example 1 is tested. A specific test method is performed according to the QB/T2761-2006 test standard. 100 g of particle materials prepared in embodiment 1 and 100 g of particle materials prepared in comparative example 1 are placed at a room temperature (20±1° C.) and humidity of 25% for the time periods listed in Table 3 (that is, 1, 10, and 24 hours and 7 days), and then placed in a 1.5 $m^3$ experimental chamber. Each experimental chamber is injected with an equal amount of formaldehyde gas in advance to obtain formaldehyde concentration of 1.0 $mg/m^3$. In addition, a fan is mounted in each experimental chamber to allow air in the experimental chamber to flow. After the particle material is placed in the experimental chamber, timing is started, and concentration of the formaldehyde in the experimental chamber is tested after about 1 hour. A proportion of a difference between initial concentration of the formaldehyde in the experimental chamber (all are 1.0 $mg/m^3$) and concentration of the formaldehyde in each experimental chamber tested after the action of the solid material to the initial concentration of the formaldehyde is used as a formaldehyde removal rate. Specific test results are shown in Table 3. It may be learned from Table 3 that, compared with the product in comparative example 1, the solid material prepared in the embodiment of the invention can remove formaldehyde gas in the air stably for a long time.

TABLE 4

Disinfection test results of the solid material in embodiment 1

| | Time | H1N1 virus removal rate (%) | Staphylococcus aureus removal rate (%) | Natural air bacteria removal rate (%) |
|---|---|---|---|---|
| Embodiment 1 | 1 hour | 99.99 | 99.99 | 93.6 |
| | 10 hours | 99.99 | 99.99 | 93.6 |
| | 24 hours | 99.99 | 99.99 | 93.6 |
| | 7 days | 99.99 | 99.99 | 93.5 |
| Comparative example 1 | 1 hour | 99.99 | 99.99 | 94.10 |
| | 10 hours | 91.01 | 90.87 | 88.03 |
| | 24 hours | 83.25 | 81.73 | 79.62 |
| | 7 days | 5.39 | 4.21 | 3.54 |

Taking the solid material prepared in embodiment 1 of the invention as a representative, a disinfection effect of the solid material of the invention is tested. 10 g of particle materials prepared in embodiment 1 and 10 g of particle materials prepared in comparative example 1 are placed at a room temperature (20±1° C.) and humidity of 25% for the time periods listed in Table 3 (that is, 1, 10, and 24 hours and 7 days), and then placed in a 1 $m^3$ experimental chamber. The same amount of germs is injected into each experimental chamber. After the particle material is placed in the experimental chamber, timing is started, and a number of germs in the experimental chamber is observed after about 24 hours. A proportion of a difference between an initial number of germs in the experimental chamber and a number of germs in each experimental chamber tested after the action of the solid material to the initial number of germs is used as a germ removal rate. It may be learned from the test results in Table 4 that, the solid material product prepared in the embodiment of the invention can release chlorine dioxide gas stably for a long time, and has a significant disinfection effect on common bacteria in the air. In addition, the test results of the product in comparative example 1 show that after a long period of time, the product in comparative example 1 has a much poorer disinfection effect than the product prepared in the embodiment of the invention.

The foregoing content is merely used for describing the technical solutions of the invention, but is not intended to limit the protection scope of the invention. Any simple modification or equivalent replacement made by a person of ordinary skill in the art on the technical solutions of the invention shall fall within the essence and scope of the technical solutions of the invention.

What is claimed is:

1. A solid material, comprising: 50-60 wt. % of inorganic porous materials, 10-20 wt. % of nano titanium dioxide, 3-5 wt. % of fluorescent materials, 20-30 wt. % of sodium chlorite, 3-5 wt. % of sodium lignosulfonate, 1-10 wt. % of polyethylene glycol, and 1-10 wt. % of polyvinyl alcohol, wherein the above weight percentage is a proportion of a weight of each component to a total weight of the solid material.

2. The solid material according to claim 1, wherein the inorganic porous material is active alumina or activated zeolite.

3. The solid material according to claim 2, wherein the active alumina has a specific surface area of 200-350 $m^2/g$ measured according to a BET test method, a pore volume of 0.3-0.45 ml/g, and an average pore size of 2-50 nm.

4. The solid material according to claim 2, wherein the activated zeolite has a specific surface area of 500-800 $m^2/g$ measured according to a BET test method, a pore volume of 0.3-0.85 ml/g, and an average pore size of 2-60 nm.

5. The solid material according to claim 1, wherein the fluorescent material is an alkaline earth aluminate fluorescent material emitting fluorescence with a wavelength of 400-580 nm.

6. The solid material for air purification according to claim 1, wherein the polyethylene glycol has a weight average molecular weight less than 2000.

7. The solid material according to claim 1, wherein the nano titanium dioxide is titanium dioxide with an average particle diameter of 1-150 nm.

8. The solid material according to claim 1, wherein the sodium lignosulfonate has a molecular weight of 400-700.

9. A method for preparing the solid material according to claim 1, the method comprising:
weighing an inorganic porous material, nano titanium dioxide, a fluorescent material, sodium chlorite, sodium lignosulfonate, polyethylene glycol, and polyvinyl alcohol;
formulating the fluorescent material and a polyethylene glycol aqueous solution into a uniformly dispersed paste to prepare a first slurry;
uniformly mixing the nano titanium dioxide, the sodium lignosulfonate, and the first slurry to prepare a second slurry;
spraying the second slurry onto the inorganic porous material, and stirring the inorganic porous material while spraying, to form a pre-product in which the second slurry is uniformly adsorbed on the inorganic porous material; and
mixing the sodium chlorite and the pre-product, putting the mixture into a granulator and spraying a polyvinyl alcohol aqueous solution into the granulator for granulation, and then performing drying to obtain the solid material;
wherein the solid material comprises 50-60 wt. % of inorganic porous materials, 10-20 wt. % of nano titanium dioxide, 3-5 wt. % of fluorescent materials, 20-30 wt. % of sodium chlorite, 3-5 wt. % of sodium lignosulfonate, 1-10 wt. % of polyethylene glycol, and 1-10 wt. % of polyvinyl alcohol, wherein the above weight percentage is a proportion of a weight of each component to a total weight of the solid material.

10. The method according to claim 9, wherein concentration of the polyethylene glycol aqueous solution is 0.05-0.1 wt. %.

11. The method according to claim 9, wherein concentration of the polyvinyl alcohol aqueous solution is 1-8 wt. %.

12. The method according to claim 9, wherein the drying comprises: heating granulated particles to 500-600° C. at a rate of 1-3° C./min, and then keeping the temperature for 1.5-5 hours.

13. The method according to claim 9, wherein the fluorescent material is prepared into the first slurry by using the polyethylene glycol aqueous solution, and the first slurry is uniformly dispersed by using ultrasonic waves.

14. The method according to claim 9, wherein the inorganic porous material is active alumina, and the active alumina is prepared by using the following method:
adding quick dehydration powder (ρ-alumina powder) to hydrated aluminum hydroxide and performing quick dehydration to prepare a first alumina material;
adding macroporous pseudo-boehmite to the first alumina material and uniformly mixing the mixture to prepare a second alumina material;
maturing the second alumina material by using microwaves; and
performing calcination at a temperature of 450-800° C. to prepare the active alumina material.

15. A method of purifying and/or disinfecting air comprising placing the solid material of claim 1 in contact with the air to be purified and/or disinfected.

16. The method of claim 15, wherein the solid material is placed in a fresh air system or an air purifier.

* * * * *